J. P. McELLIOTT.
AUTOMATIC DIRECTING MEANS FOR HEADLIGHTS.
APPLICATION FILED SEPT. 19, 1910.
1,021,843. 
Patented Apr. 2, 1912.
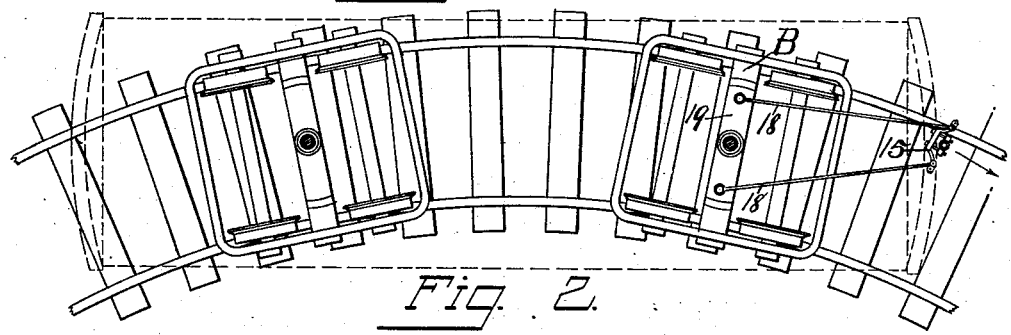
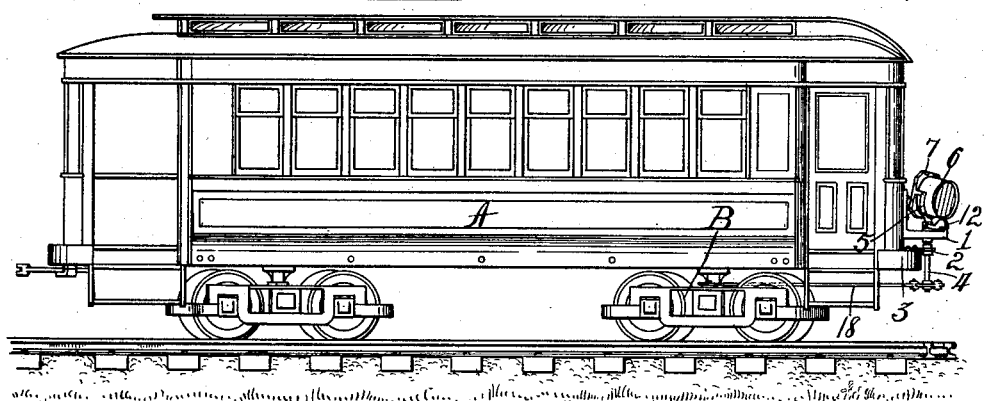
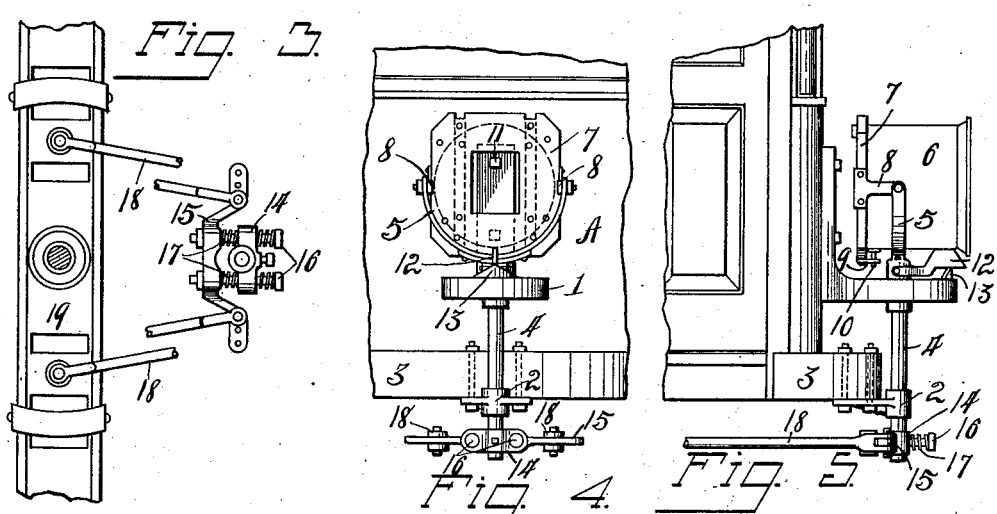
WITNESSES:  
INVENTOR.  
Joseph P. McElliott,  
By Owen & Owen,  
His attys.

UNITED STATES PATENT OFFICE.

JOSEPH P. McELLIOTT, OF TOLEDO, OHIO, ASSIGNOR TO THE AUTOMATIC MOVABLE HEADLIGHT COMPANY, OF TOLEDO, OHIO, A CORPORATION OF OHIO.

AUTOMATIC DIRECTING MEANS FOR HEADLIGHTS.

1,021,843.                    Specification of Letters Patent.         Patented Apr. 2, 1912.

Application filed September 19, 1910. Serial No. 582,760.

*To all whom it may concern:*

Be it known that I, JOSEPH P. McELLIOTT, a citizen of the United States, and a resident of Toledo, in the county of Lucas and State of Ohio, have invented a certain new and useful Automatic Directing Means for Headlights; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to mechanism of the class employed to automatically turn the head lights of engines, cars and the like, in a direction of the curved portions of a track or course, and be deflected vertically to the track.

The object of my invention is to provide a mechanism of this class which is strong, durable and economical in its construction and composed of as few parts as is consistent to meet the various requirements thereof, as, to produce like results when operating on either a right or left curve and to focus the light to the track or course at a short or long distance ahead proportionate to the degree of curvature of the track or course.

The invention is fully described in the following specification, and, while in its broader aspect, it is capable of embodiment in numerous forms, a preferred embodiment thereof is illustrated in an accompanying drawing, in which,—

Figure 1 is a plan view of the curved portion of a track with the trucks of a car rounding the same and having parts of the invention associated therewith. Fig. 2 is a side view of a car rounding a curve and equipped with the invention. Fig. 3 is an enlarged view of the central portion of a truck beam and a portion of the head light actuating mechanism associated therewith, and Figs. 4 and 5 are front and side elevations of such mechanism and a portion of an associated car with the position of the headlight shown in dotted lines.

Referring to the drawings, A designates a car body and B the customary front truck thereof.

Projecting centrally from the front of the car is a bracket 1, and journaled in this and a bearing 2, secured, in the present instance, to the deadwood 3 of the car, is a vertical shaft 4. The upper end of this shaft projects above the projecting portion of the bracket 1 and is provided with a yoke 5 within which the headlight 6 is mounted for vertical oscillatory movements.

To removably carry the customary forms of head lights, I provide a back-frame 7 for the headlight, which frame has arms 8 projecting forwardly from its side edges adjacent its vertical center and pivoted at their forward ends to the upper ends of the arms of the yoke 5. The back frame 7 is adapted for removably carrying the headlight 6 in the same manner that the headlight is usually carried by a car, the frame being provided for such purpose with an apertured tongue 9 at its lower edge through which a pin 10 at the lower rear edge of the lamp projects, and having suitable lamp clamping means, as, for instance, a catch 11, adjacent its upper portion.

The forward end of a headlight 6 is adapted to lower by gravity due to the major portion of the weight of the lamp being in advance of the pivots of the frame arms 8, and is supported in proper position by a lamp-rest 12, which is pivoted at its rear end to the shaft 4 to adapt it to turn horizontally therewith and has its forward end resting upon an inverted V-shaped cam 13 provided on the upper forward edge of the bracket 1.

To the lower end of the shaft 4 is secured a compound cross-arm, which comprises the fixture member 14 to which is slidably connected a cross-arm 15 by the parallel rods 16, 16 which project rigidly from such cross-arm and work loosely through the member 14. The cross-arm 15 and attached rods 16 are held sufficiently rigid relative to the member 14 to effect a rotation of the shaft 7 upon a turning of the cross-arm due to the mounting of resistant springs 17 on the rods 16 intermediate the parts 14 and 15. The ends of the cross-arm 15 are connected by rods 18 to the cross-beam 19 of the forward truck B at opposite sides of its axis as shown at 20, thus causing the shaft 4 to be turned upon a turning movement of the truck relative to the car-body. The purpose of providing the yielding action between the cross-arm 15 and member 14 is to prevent breakage of the parts connecting the truck 8 and shaft 4 upon the forward and backward or vertical oscillatory movements of the truck beam 16 in relation to the car body.

It is apparent with this construction, that upon a turning of the front truck B relative to the body of a car in rounding a curve, a corresponding rotary movement will be communicated to the vertical shaft 4 from the truck through the intermediate connecting parts, and that the rotation of the shaft will horizontally rotate the lamp 6 therewith in proportion to the degree of curve of the track. As the lamp turns horizontally from normal or straight forward position shown in Figs. 5 and 6, the rest 12 rides upon one of the inclined planes of the cam 13 to permit a vertical tilting of the lamp, which is also in proportion to the curvature of the track to cause the light rays to be constantly directed to the center of the track at a distance in advance of the car. When the car faces upon a straight portion of the track the light is automatically righted to again direct its rays straight ahead.

I wish it understood that my invention is not limited to any specific construction or arrangements of the parts except in so far as such limitations are specified in the claims.

Having thus described my invention, what I claim as new and desire to secure by Letters Patent, is,—

1. The combination with a vehicle having a part which turns in following a curved course, of a vertical shaft carried by said vehicle, a headlight supported by such shaft, a member secured to such shaft and having transverse openings therethrough on opposite sides of the shaft, rods carried in parallelism by such member and working loosely through the openings therein, a cross arm connecting said rods and projecting outwardly beyond the same, means carried by said rods and yieldingly spacing said member and cross arm, and means connecting said cross arm and vehicle part for imparting rotation to the shaft upon a turning of such vehicle part.

2. The combination with a vehicle, having a part which turns in following a curved course, of a vertical shaft carried by such vehicle, a headlight supported by such shaft, a part fixed to such shaft, rods working loosely through such part, a cross-arm carried by such rods, means yieldingly spacing said shaft part and cross-arm and rods connecting such cross-arm and vehicle part for imparting rotation to the shaft upon a turning of such vehicle part.

3. The combination with a vehicle having a part which turns relative thereto in following a curved course, of a bracket having an inverted V-shaped cam adjacent its upper outer edge, a vertical shaft in association with such bracket, connection between the shaft and vehicle part for imparting rotation from one to the other thereof, a member pivoted for vertical movements to such shaft and resting at its forward end upon said cam, and a headlight carried by the shaft for vertical oscillatory movements and resting by gravity upon the outer end portion of said member.

4. The combination with a vehicle, of a vertical shaft, a yoke carried at the upper end of the shaft, a back frame for a lamp having arms projecting forward therefrom and pivoted to the ends of the yoke arms, a lamp removably carried by said back frame, and means causing the lamp and frame to have vertical tilting movements upon a turning of the shaft from or to neutral position.

In testimony whereof, I have hereunto signed my name to this specification in the presence of two subscribing witnesses.

JOSEPH P. McELLIOTT.

Witnesses:
  Geo. H. Gordon,
  Frank Mayden.

Copies of this patent may be obtained for five cents each, by addressing the "Commissioner of Patents, Washington, D. C."